Figure 2:
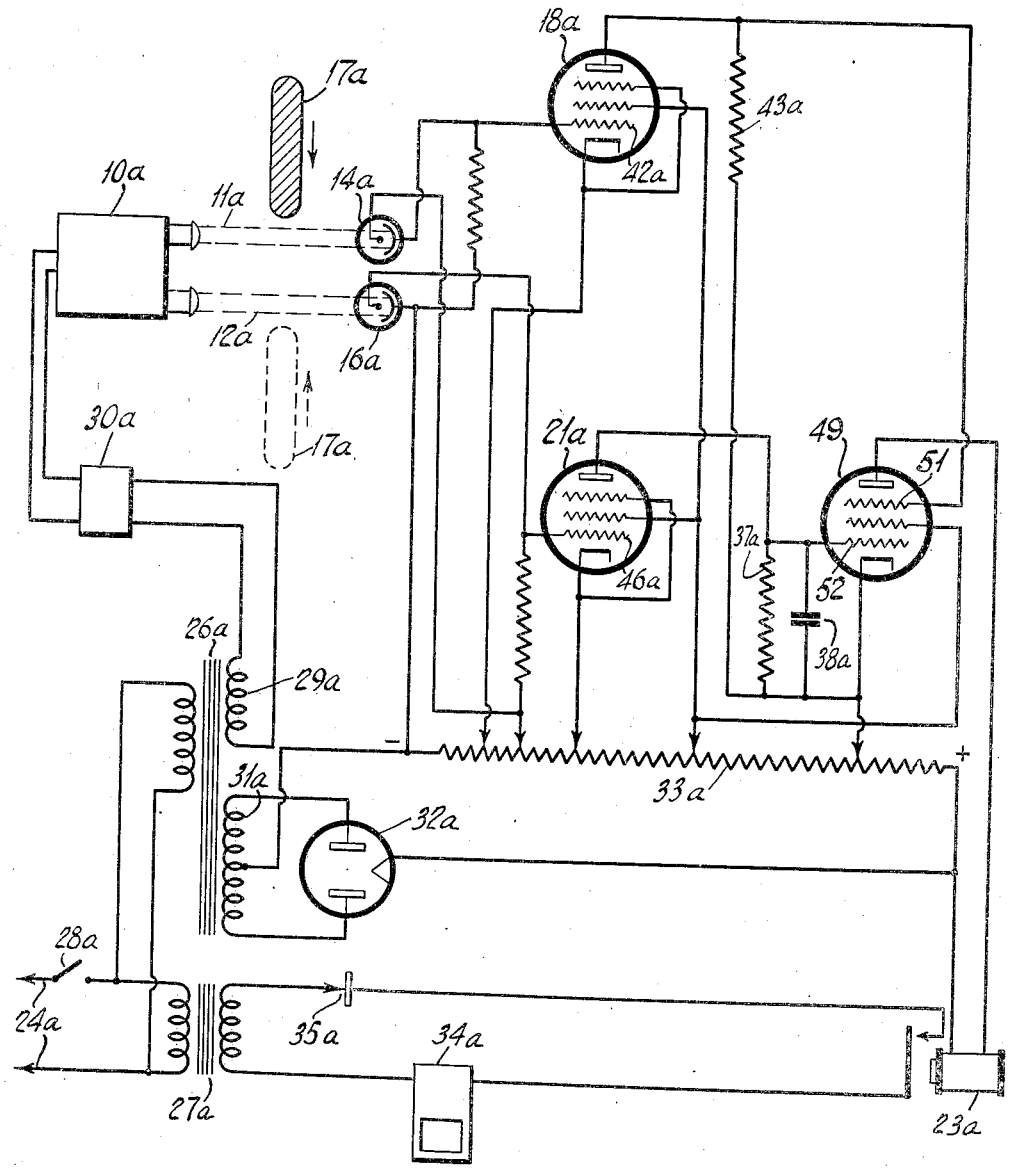

Dec. 24, 1946.    J. R. SCHICK    2,413,076
RADIATION SENSITIVE RELAY SYSTEM
Filed May 11, 1943    2 Sheets-Sheet 1

Fig.1.

INVENTOR
JOHN R. SCHICK.
BY
ATTORNEY

Dec. 24, 1946.    J. R. SCHICK    2,413,076
RADIATION SENSITIVE RELAY SYSTEM
Filed May 11, 1943    2 Sheets-Sheet 2

INVENTOR
JOHN R. SCHICK.
BY
ATTORNEY

Patented Dec. 24, 1946

2,413,076

UNITED STATES PATENT OFFICE 2,413,076

RADIATION SENSITIVE RELAY SYSTEM

John R. Schick, Santa Ana, Calif., assignor to Radio Corporation of America, a corporation of Delaware Application May 11, 1943, Serial No. 486,517

5 Claims. (Cl. 250—41.5)

The present invention relates to radiation-sensitive relay systems, and more particularly to a system for indicating recording the direction of movement of an opaque mass or spot on or in a transparent or translucent material. The time of passage of a mass or spot, or a series of masses or spots may also be indicated or recorded.

Photo-electric relay systems of the prior art are unable to discriminate against opaque masses passing through a beam of light in a forward or backward direction. It is frequently desirable to have a system which will operate only when the opaque mass passes through the beam of light in one direction. Such a system, which is provided by the present invention, is useful as an electronic counter, for example. It may be used in many places, such as theaters, where an accurate record is kept of patrons entering the theater, but where there is no special desire to know the number of people leaving the theater. Discrete articles or particles may be appraised in some manner by apparatus embodying the invention and/or may be counted by it. Therefore, it is a major object of the present invention to provide a photo-electric system employing a plurality of photocells which will indicate the presence of an opaque moving mass or body only when it is moving in a predetermined direction.

Another object of the present invention is to provide a novel electronic counter device.

A further object of the present invention is to provide a novel form of one way indicator.

A still further object of the present invention is to provide a novel radiant energy sensitive system for obtaining an immediate indication of movement in a given direction of an opaque spot or mass, the time of occurrence of this indication being substantially independent of the speed of movement of the spot or mass or of its extent.

Other and more specific objects of the invention will appear in the following description, reference being made to the drawings, in which:

Fig. 1 is a diagrammatic showing of a directional movement detecting system in accordance with the invention and Fig. 2 illustrates a modification of the system of Fig. 1.

Referring to Fig. 1 for a detailed description of an illustrative embodiment of the invention shown therein, reference character 10 indicates a device for projecting light in the form of directed beams 11 and 12 onto a pair of similar closely spaced photocells or phototubes 14 and 16. While the term "light" is used hereinafter to designate the character of the beams 11 and 12, it will be understood that any portion or all of the visible spectrum may be present in these beams, as well as invisible ultra-violet or infra-red radiations whether or not they are combined with visible components. Also, the light projecting device 10 may project only a single beam which is received by both photocells. The photocells 14 and 16 may be housed in any desired manner (not shown) so as to diminish the effect thereon of ambient light. As will hereinafter appear, the spacing between the two tubes or cells may vary within wide limits. However, in most cases, it is desirable to have them as closely spaced as is convenient or possible.

Reference character 17 indicates a movable mass which is opaque to light of the character emitted by the device 10 and, upon its movement in the direction of the solid line arrow the system will operate to give an indication of this movement immediately upon interruption of the beam 11. It will be understood that the opaque mass 17 may be any opaque body which is expected to move in the direction of the arrow or which moves periodically or in any other manner in the assumed direction. Also, the mass 17 may be an opaque spot or mark in or on a transparent or translucent moving strip or web which lies in a plane perpendicular to the beams 11 and 12 and which is moved in the direction of the arrow.

The photocell 14 is connected through a first space discharge or thermionic amplifier tube 18 to a second space discharge or thermionic tube 19. Likewise, the photocell 16 is connected through a first thermionic amplifier tube 21 to the second thermionic tube 22. The space discharge paths of the tubes 19 and 22 are connected effectively in series with the series circuit including a relay 23 or other desired translating device and any suitable energy source. The tubes 18 and 21 in the illustrative embodiment are shown as pentode amplifiers but any type of tube may be used so long as the required voltage swing is obtained at the control grids of the tubes 19 and 22. The tubes 19 and 22, illustrated as pentodes, may be of any type as long as they are capable of passing sufficient current to operate the translating device 23 which, as was pointed out above, is selected in view of the particular use contemplated. These tubes 19 and 22 preferably are of the sharp cut-off type. It is also desirable that the tubes 19 and 22 have such characteristics that the grid voltages available during normal operation of the system will bias them to cut-off. The relay 23 may, as suggested above, be replaced by an audible signaling device, visual indicator, a counter device, or any other desired device suitable to the purpose. The photoelectric cells or tubes 14 and 15 may be of any desired type including those which do not require an anode supply voltage.

The system, organized as shown in Fig. 1, may be connected to any suitable alternating current source 24 which is connected to the primaries of transformers 26 and 27. A switch 28 of any desired type facilitates disconnection of the power supply to the system when desired. The secondary 29 of the transformer 26 is connected to and energizes the light source or sources of the device 10 through a rectifier and filter combination 30. The rectifier and filter may be omitted if the frequency of the supply source is sufficiently high. However, any convenient and suitable power source may be used for the light 10. The transformer secondary 31 provides D. C. operating voltages for the vacuum tubes through a rectifier 32. A voltage divider 33 provides for adjustment of the voltages applied to the individual elements of the several tubes. The voltage divider 33 may be omitted where the system is operated by alternating current taken from the secondary 31, self rectification of the tubes in this case providing for satisfactory operation. Additional transformer taps, for example, may supply suitable voltages for alternating current operation. The supply source 24 may be alternating voltage, direct voltage or pulsating voltage as long as the frequency of the alternating and pulsating types is reasonably higher than the frequency with which the opaque mass 17 will pass between the device 10 and the photocells 14 and 16. The secondary of the transformer 27 is connected through the tongue and contact of relay 23 to a signaling device shown as a gong, bell, counter or the like 34. A rectifier 35 may be added if D. C. operation is desired. The relay contact may be either a make contact as shown, or a break contact.

The theory of amplifier biasing is well known and the illustrated connections to the voltage divider 33 are suggestive only and may be altered depending on the characteristics of the photocells and tubes selected and the specific manner in which the system is employed.

In the circuit including the control grid 36 of the tube 22 and also, in the plate circuit of the tube 21, is a resistor 37 shunted by a condenser 38. The capacitance of the condenser 38 may be such that the time constant for the combination is quite long for applications of the system where the opaque mass 17 moves slowly, or is quite short where the mass 17 moves rapidly. The control grid 39 of the tube 19 is biased to cut-off when the photocell 14 is excited by light from the source 10. The control grid 39 has zero bias when the photocell 14 is no longer excited by light from the source 10. Cut-off bias is applied to the control grid 36 of the tube 22 when an opaque mass such as 17 is interposed between the photocell 16 and the device 10. When the photocell 16 is excited by light from the device 10, the control grid 36 of the tube 22 is substantially unbiased.

The system of Fig. 1, the elements of which have been briefly described, operates in the following manner. In the normal condition of the system, when light from the device 10 is falling on the photocells 14 and 16, photo-electric cell 14 is causing a current to flow through a resister 41, which is common to the circuit of the control grid 42 of the tube 18 and the elements of the photo-electric cell 14. The current flow through the resister 41 causes a voltage drop to appear which is of such polarity as to cause a positive voltage to be applied to the control grid 42. The tube 18 draws plate current which, in turn, causes a voltage drop in a resister 43 in the circuit of the control grid 39 of the tube 19. This voltage drop is of such polarity as to cause negative cut-off bias to appear on the control grid 39. The photo-electric cell 16 being illuminated, is causing the current to flow through a resister 44 in the circuit of the control grid 46 of the tube 21. A voltage drop results which appears as a negative cut-off bias voltage on the control grid 46. Thus, tube 21 is not drawing plate current and no voltage drop appears at the control grid 36 of the tube 22. Tube 22 is in a condition to draw plate current and, therefore, the circuit including the space discharge paths of the tubes 19 and 22 is prepared so that current will flow when the tube 19 is rendered conducting during a point in the travel of the opaque mass 17.

When the opaque mass 17, moving in the direction of the arrow intercepts the light beam 11, the photo-electric cell no longer permits current to pass through the resister 41, and tube 18 is cut-off by virtue of the fixed control grid bias applied from the voltage supply source. Due to tube 18 not drawing plate current, no current is flowing through the resister 43 in the control grid circuit of the tube 19, and tube 19 has zero bias voltage on its control grid. Tube 19 is now in a conductive condition and, therefore, current flows in the circuit including the space discharge paths of the tubes 19 and 22, the tube 22, being in a conductive condition as pointed out above. The relay 23, which is also included in this circuit, is energized to operate the indicating device 34 at its tongue and make contact.

The relay 23 remains energized until the opaque mass intercepts the light beam 12 to cut-off illumination of the photocell 16 from the device 10. When the photocell 16 is no longer activated, no current is passing through the resister 44 and consequently, no cut-off bias is supplied to the control grid 46. The tube 21 draws plate current and causes a voltage drop to appear across the resister 37, which is in the circuit of the control grid 36 of the tube 22. This voltage drop is of such a polarity as to cause negative cut-off bias to appear on the control grid 36 of the tube 22 and also discharges the condenser 38 instantly. The tube 22 is now in a non-conducting condition and the relay 23 is de-energized thereby opening the circuit including the indicating device 34.

As the opaque mass 17 passes on through the light beams and begins to pass out of their paths, photo-electric cell 14 is illuminated first. When photocell 14 only is activated by light, cut-off control grid bias is restored on the tube 19. When the opaque mass 17 has passed entirely out of the path of the beams 11 and 12, photocell 16 causes current to again flow through the resister 44, which causes cut-off control grid bias to be restored to the tube 21, which no longer draws plate current through the resister 37. The condenser 38 is charged up and begins to discharge through the resister 37. When the condenser is discharged, cut-off control grid bias is removed from the tube 22, again preparing the circuit including the space discharge paths of the tubes 19 and 22.

If the opaque mass 17 moves in the reverse from its dotted line position on Figure 1, in the direction of the dotted line arrow, light from the device 10 is cut-off from the photocell 16 first. Until the opaque mass 17 has progressed further in the direction of the dotted line arrow, the photocell 14 is still illuminated. Cut-off control grid bias appears on the grid 36 of the tube 22 in the manner explained above with the beam 12 interrupted. As the opaque mass continues to move in the direction of the dotted line arrow, light is ultimately cut-off from the photocell 14. The cut-off control grid bias on the grid 39, of the tube 19, is removed in the manner explained above, but the tube 19 cannot draw plate current due to the tube 22 being cut-off and, therefore, is not in a condition to draw plate current. As the opaque mass continues on through the paths of the light beams 11 and 12, and starts to pass out of the path of the beam 12, light is restored to the photocell 16 first. The cut-off control bias on the grid 36 of the tube 32 is removed as soon as the condenser 38 discharges through the resister 37. The time taken for this condenser to discharge is so chosen, that by the time it has discharged, the opaque mass has passed out of the paths of both beams of light 11 and 12 and light has been restored to the photocell 14. Light having been restored to this photocell, the system is again in its normal unoperated condition and the tube 19 is cut-off. During the passage of the opaque mass 17 in the direction of the dotted line arrow through the paths of the light beams 11 and 12, it is to be noted that the relay 23 was not operated and the system discriminated against the direction of movement of the opaque mass 17.

In the modification of the system of the invention shown in Fig. 2 of the drawings, elements of the system corresponding to those shown in Fig. 1 are given the same reference characters with the subscript "a" added. The tubes 19 and 22 of Fig. 1 are replaced by a single pentode tube 49. The photocells 14a and 16a and the voltage amplifier tubes 18a and 21a perform their functions in the manner already described above in connection with Fig. 1 of the drawings. When the photocell 14a is illuminated, negative cut-off bias is applied to the electrode 51 of the tube 49, which ordinarily serves as a suppressor grid. When illumination from the device 10a, normally impinging on the photocell 16a, is interrupted, negative cut-off bias is applied to the control grid 52 of the tube 49. The arrangement just described, employing a single tube 49 in place of the tubes 19 and 22, possesses the advantage of requiring less voltage supply. In view of the foregoing complete description of the operation of the system illustrated in Fig. 1 of the drawings, it is believed that operation of the system of Fig. 2 will be obvious. Under conditions herein explained the geometry of tube 49 should preferably be such that the control electrodes 51 and 52 have substantially equal effect in the current flow in the tube.

Having now described my invention, what I claim is:

1. A system for detecting the direction of movement of a mass opaque to radiant energy of a given kind comprising a source of radiant energy to which said mass is opaque, a plurality of radiant energy sensitive devices normally receiving radiant energy from said source, a plurality of space discharge devices having their space discharge paths connected effectively in series, means to render one of said space discharge devices non-conducting when one of said radiant energy sensitive devices is receiving radiant energy from said source, means to render another of said space discharge devices non-conducting when radiant energy is cut off from another of said radiant energy sensitive devices, an electromagnetic translating device, and a connection from said translating device to said space discharge devices whereby said translating device is included in a series circuit embracing the space discharge paths of said space discharge devices.

2. A system for detecting the direction of movement of a mass opaque to radiant energy of a given kind comprising a source of radiant energy to which said mass is opaque, a plurality of radiant energy sensitive devices normally receiving radiant energy from said source, a plurality of space discharge devices having their space discharge paths connected effectively in series, means to render one of said space discharge devices non-conducting when one of said radiant energy sensitive devices is receiving radiant energy from said source, means to render another of said space discharge devices non-conducting when radiant energy is cut off from another of said radiant energy sensitive devices, time delay means to prolong the effect of said last named means to maintain said other tube non-conducting for a predetermined time after illumination is restored, an electromagnetic translating device, and a connection from said translating device to said space discharge devices whereby said translating device is included in a series circuit embracing the space discharge paths of said space discharge devices.

3. A system for detecting the direction of movement of an opaque mass comprising a pair of photoelectric cells, a light source for directing light onto said cells, a pair of electronic devices each having a cathode, an anode and a control electrode, means including a source of biasing potential connecting one of said photoelectric cells to the control electrode of one of said electronic devices to bias the same to cutoff when said photoelectric cell is illuminated, means including a source of biasing potential connecting the other of said photoelectric cells to the control electrode of the other of said electronic devices to bias said other electronic device to cutoff when light impinging on said other photoelectric cell is interrupted, electrically operated indicating means connected in series with the anode to cathode paths of said devices, said series connection including a source of anode voltage.

4. A system for detecting the direction of movement of an opaque mass comprising a pair of photo-electric cells, a light source for directing light onto said cells, a vacuum tube relay having a cathode, an anode and a control electrode, means including a source of biasing potential connecting one of said photo-electric cells to the control electrode of said vacuum tube to bias the same to cutoff when said photo-electric cell is illuminated, means to interrupt the flow of plate current in said tube comprising a resistor, a source of biasing potential connecting the other of said photo-electric cells to said last named means, a condenser shunted across said resistor, said resistor and condenser combination having a time constant chosen to compensate for the time of passage of an opaque body in the non-detecting direction, and an electrically operated indicating means connected in series with the anode to cathode path of said vacuum tube, said series connection including a source of anode voltage.

5. A system for detecting the direction of movement of an opaque mass comprising a pair of photo-electric cells, a light source for directing light onto said cells, a pair of vacuum tube relays each having a cathode, an anode and a control electrode, means including a source of biasing potential connecting one of said photo-electric cells to the control electrode of one of said vacuum tubes to bias the same to cutoff when said photo-electric cell is illuminated, a resistor, a source of biasing potential connecting the other of said photo-electric cells to the control electrode of the other of said vacuum tubes to bias said other tube to cutoff when light impinging on said other photo-electric cell is interrupted, a condenser shunted across said resistor, said resistor and condenser combination having a time constant chosen to compensate for the time of passage of an opaque body in the non-detecting direction, and an electrically operated indicating means connected in series with the anode to cathode paths of said vacuum tubes, said series connection including a source of anode voltage for said tubes.

JOHN R. SCHICK.